(12) United States Patent
Yang et al.

(10) Patent No.: US 12,735,287 B2
(45) Date of Patent: Sep. 15, 2026

(54) WINDING NEEDLE ASSEMBLY AND WINDING DEVICE

(71) Applicant: CONTEMPORARY AMPEREX TECHNOLOGY (HONG KONG) LIMITED, Hong Kong (CN)

(72) Inventors: Guozhong Yang, Ningde (CN); Xiaobin Li, Ningde (CN); Yaji Zhang, Ningde (CN); Ying Gao, Ningde (CN); Zijing Zhuang, Ningde (CN); Ning Song, Ningde (CN); Xiangli Sun, Ningde (CN); Fengdan Li, Ningde (CN); Xiaoping Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 93 days.

(21) Appl. No.: 18/887,982

(22) Filed: Sep. 17, 2024

(65) Prior Publication Data

US 2025/0011118 A1 Jan. 9, 2025

Related U.S. Application Data

(63) Continuation of application No. PCT/CN2022/108172, filed on Jul. 27, 2022.

(51) Int. Cl.
*B65H 18/10* (2006.01)
*H01M 10/04* (2006.01)

(52) U.S. Cl.
CPC ........ *B65H 18/10* (2013.01); *H01M 10/0409* (2013.01); *B65H 2301/41429* (2013.01); *B65H 2405/50* (2013.01); *B65H 2701/19* (2013.01)

(58) Field of Classification Search
CPC .. B65H 18/10; H01M 10/04; H01M 10/0409; H01M 10/0431; H01M 10/052; H01M 10/0587
See application file for complete search history.

(56) References Cited

U.S. PATENT DOCUMENTS 12,002,919 B2 * 6/2024 Zhang ............... H01M 10/0431
12,355,027 B2 * 7/2025 Zhang ............... H01M 10/0409
(Continued)

FOREIGN PATENT DOCUMENTS

CN 206992254 U 2/2018
CN 208797128 U 4/2019
(Continued)

OTHER PUBLICATIONS

International Search Report for PCT Application No. PCT/CN2022/108172, mailed on Apr. 8, 2023.

*Primary Examiner* — Sang K Kim
(74) *Attorney, Agent, or Firm* — K&L Gates LLP

(57) ABSTRACT

Embodiments of the present application provide a needle winding assembly for winding electrode plates and a separator and a winding device. The winding needle assembly includes a first winding needle and a second winding needle for clamping the separator, and the second winding needle is provided with a rolling member on a side of the second winding needle toward the first winding needle. Due to the presence of the rolling member, there is rolling friction between the rolling member and the first winding needle, reducing the friction between the first winding needle and the second winding needle, which avoids scratching the separator when the winding needle assembly is inserted into the separator or pulled out of the separator, or avoids misplacing and bringing out part of the separator when the second winding needle is pulled out, which otherwise would reduce the production efficiency of the battery.

20 Claims, 8 Drawing Sheets

(56) References Cited

U.S. PATENT DOCUMENTS

| | | | | |
|---|---|---|---|---|
| 2006/0035147 | A1* | 2/2006 | Lam | H01M 4/70<br>429/231.5 |
| 2023/0275254 | A1* | 8/2023 | Yoo | H01M 10/0587<br>29/623.1 |
| 2023/0327175 | A1* | 10/2023 | Zhang | H01M 50/474<br>429/94 |
| 2023/0361335 | A1* | 11/2023 | Zhang | H01M 10/0409 |
| 2024/0269762 | A1* | 8/2024 | Woo | B23K 11/36 |

FOREIGN PATENT DOCUMENTS

| | | | | |
|---|---|---|---|---|
| CN | 209312947 | U | | 8/2019 |
| CN | 112259805 | A | | 1/2021 |
| CN | 213176688 | U | | 5/2021 |
| CN | 2021217725422 | | * | 8/2021 |

* cited by examiner

WINDING NEEDLE ASSEMBLY AND WINDING DEVICE

CROSS-REFERENCE OF RELATED APPLICATIONS

The present application is a continuation of International Application No. PCT/CN2022/108172, filed on Jul. 27, 2022, the contents of which are hereby incorporated by reference in its their entireties.

TECHNICAL FIELD

The present application relates to the field of battery processing technology, and more specifically, relates to a winding needle assembly and a winding device.

BACKGROUND

Currently, based on the development of the market situation, the application of the power battery is becoming increasingly widespread. Power battery is not only used in energy storage power systems such as hydropower, firepower, wind power, and solar power plants, but also widely used in electric vehicle such as electric bicycle, electric motorcycle, and electric automobile, as well as in various fields such as military equipment and aerospace. With the continuous expansion of the application field of the power battery, its market demand is also constantly expanding.

In the development of battery technology, how to improve the production efficiency of a battery is an important research direction.

SUMMARY

The present application provides a winding needle assembly and a winding device that can improve the production efficiency of the battery.

In the first aspect, the embodiments of the present application provide a winding needle assembly for winding electrode plates and a separator. The winding needle assembly includes a first winding needle and a second winding needle, the first winding needle and the second winding needle are configured to clamp the separator, and the second winding needle is provided with a rolling member on a side of the second winding needle toward the first winding needle.

In the above solution, when the electrode assembly of the battery cell is prepared, the first winding needle is placed on a side of the separator, and then the second winding needle is moved along the first winding needle toward the direction of the separator until the second winding needle and the first winding needle clamp the separator. Then, the winding needle assembly is driven to rotate, and the electrode plates are inserted into the separator to rotate with the winding needle assembly until a certain thickness of electrode assembly is obtained by winding. Then the second winding needle is moved along the first winding needle and pulled out, and finally the first separator is pulled out. Due to the presence of the rolling member arranged on the side of the second winding needle toward the first winding needle, there is rolling friction between the rolling member and the first winding needle, reducing the friction between the first winding needle and the second winding needle, which avoids scratching the separator when the winding needle assembly is inserted into the separator or pulled out of the separator, or avoids misplacing and bringing out part of the separator when the second winding needle is pulled out, which otherwise would reduce the production efficiency of the battery.

In some embodiments, the first winding needle includes a first connecting part and a first winding part that are connected to each other. The second winding needle includes a second connecting part and a second winding part that are connected to each other, the second connecting part and the first connecting part are fixed to each other, the first winding part and the second winding part are configured to clamp the separator, and the rolling member is arranged on a side of the second winding part toward the first winding part.

In the above solution, the first winding part and the second winding part are close to each other and assembled for winding the separator and the electrode plates. The first connecting part and the second connecting part are fixed to each other, improving the stability of the needle winding assembly and ensuring that the needle winding assembly can maintain stability during the winding process.

In some embodiments, the rolling member is arranged at an end of the second winding part away from the second connecting part.

In the above solution, as the rolling member is arranged in the front of the second winding part, during the insertion of the second winding needle into the separator, it can ensure that the first and second winding needles always come into contact through the rolling member, further improving the protective effect of the winding needle assembly for the separator.

In some embodiments, a first inclined surface is provided at an end of the first winding part away from the first connecting part; a second inclined surface is arranged at an end of the second winding part away from the first winding part, and the first inclined surface is opposite to the second inclined surface.

In the above solution, the first inclined surface and the second inclined surface are configured for positioning an external mechanism. The first inclined surface and the second inclined surface have a guiding function, and the external mechanism can be inserted between the first inclined surface and the second inclined surface to support the first and second winding parts apart and adjust the distance between the first and second winding parts.

In some embodiments, the first connecting part protrudes in a direction away from the second winding needle relative to the first winding part; and/or, the second connecting part protrudes in a direction away from the first winding needle relative to the second winding part.

In the above solution, the thickness of the first connecting part is greater than that of the first winding part, and/or the thickness of the second connecting part is greater than that of the second winding part. The first and/or second winding parts are relatively thin, facilitating the first and second winding parts to wind the separator, and improving the energy density of the battery cell. The first and/or second connecting parts are relatively thick, facilitating the connection and fixation between the first and second connecting parts, and improving the strength of the entire needle winding assembly.

In some embodiments, the side of the second winding needle toward the first winding needle and the side of the first winding needle toward the second winding needle are both planar.

In the above solution, it is convenient for the first and second winding needles to fit together, reducing the gap between the first and second winding needles, enhancing the parallelism between the first and second winding needles, and improving the winding effect of the winding needle assembly.

In some embodiments, at least a portion of the rolling member protrudes from the side of the second winding needle toward the first winding needle.

In the above solution, it is ensured that the second winding needle always contacts the first winding needle through the rolling member when the second winding needle is inserted into the separator or pulled out of the separator relative to the first winding needle, avoiding sliding friction between the first winding needle and the second winding needle, instead of being replaced by rolling friction, ensuring that the winding needle assembly does not scratch the separator when the winding needle assembly is inserted into the separator or pulled out of the separator, and that the second winding needle does not misplace and bring out part of the separator when the second winding needle is pulled out.

In some embodiments, the rolling member protrudes for 0.5-5 mm from the side of the second winding needle toward the first winding needle.

In the above solution, the rolling member is slightly convex relative to the second winding needle, which can ensure rolling friction between the first winding needle and the second winding needle, reduce the friction between the two, and avoid the protruding part of the rolling member being too thick, affecting the parallelism between the first winding needle and the second winding needle.

In some embodiments, a first groove is provided on the side of the first winding needle toward the second winding needle, and the first groove is configured to avoid the rolling member.

In the above solution, when the second winding needle is inserted into place, the protruding part of the rolling member relative to the first winding needle can be accommodated in the first groove of the second winding needle, ensuring the parallelism between the first winding needle and the second winding needle, and improving the winding effect of the winding needle assembly.

In some embodiments, a second groove is provided on the side of the second winding needle toward the first winding needle, the rolling member is accommodated in the second groove, and the second groove is opposite to the first groove.

In the above solution, due to the symmetrical design of the second groove of the second winding needle and the first groove of the first winding needle, the winding needle assembly is more aesthetically pleasing, and the same mold can be used to obtain the first groove and the second groove during processing without distinction, thereby improving processing efficiency.

In some embodiments, a third groove is provided by recessing a bottom wall of the second groove toward a side away from the first winding needle, and at least part of the rolling member is accommodated in the third groove.

In the above solution, the disposing of the third groove can ensure that more part of the rolling member is accommodated in the first winding needle, and only a few part of the rolling member protrudes. The third groove has a limiting effect for the rolling member, improving the stability of the rolling member during rolling.

In some embodiments, the rolling member includes a fixed shaft and a rolling body, with both ends of the fixed shaft fixed to the second winding needle respectively. The rolling body is rotatably connected to a fixed shaft, further improving the stability of the rolling member during rolling.

In some embodiments, the first winding needle is provided with at least one first fixing hole, and the second winding needle is provided with at least one second fixing hole, which is disposed corresponding to the first fixing hole. Through the first fixing hole and the second fixing hole, a fixed connection between the first winding needle and the second winding needle can be achieved. The connection way is simple, the cost is reduced and the assembly efficiency is improved.

In some embodiments, the first winding needle is provided with a first positioning part, which is configured to fix with an external mechanism; and/or; the second winding needle is provided with a second positioning part, which is configured to fix with an external mechanism, further improving the stability of the winding needle assembly during winding.

In the second aspect, the embodiments of the present application provide a winding device including a driving mechanism and a winding needle assembly of any of the above embodiments, wherein the driving structure is configured to drive the winding needle assembly to rotate.

BRIEF DESCRIPTION OF THE DRAWINGS

In order to provide a clearer explanation of the technical solution of the embodiments of the present application, a brief introduction will be given to the accompanying drawings required in the embodiments of the present application. It is evident that the accompanying drawings described below are only some embodiments of the present application. For ordinary skilled person in the art, other accompanying drawings can be obtained based on the drawings without any creative effort.

Figure 1:
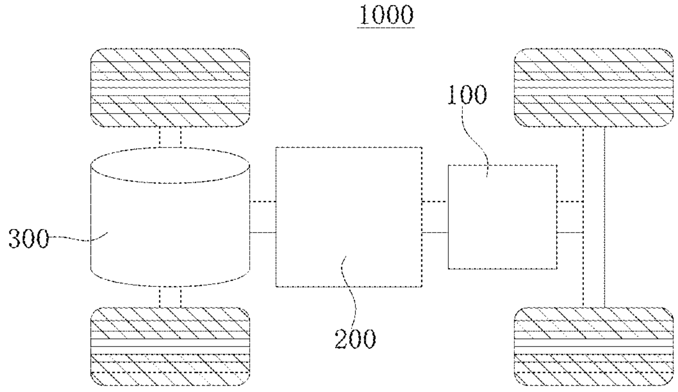
FIG. 1 is a structural schematic diagram of the vehicle provided in some embodiments of the present application.

In the accompanying drawings, the drawings are not drawn to the actual scale.

DETAILED DESCRIPTION

In order to make the purpose, technical solution, and advantages of the embodiments of the present application clearer, the technical solution in the embodiments of the present application will be clearly described below in conjunction with the accompanying drawings. Obviously, the described embodiments are a part of the embodiments of the present application, not all of the embodiments. Based on the embodiments in the present application, all other embodiments obtained by ordinary skilled person in the art without creative labor fall within the scope of protection in the present application.

Unless otherwise defined, all technical and scientific terms used in the present application have the same meanings as those commonly understood by the skilled person in the technical field of the present application. The terms used in the specification of the present application are only for the purpose of describing specific embodiments and are not intended to limit the present application. The terms "including" and "having" and any variations thereof in the description and claims of the present application, as well as the accompanying drawings, are intended to cover non-exclusive inclusion. The terms "first", "second", etc. in the specification and claims of the present application or the accompanying drawings are configured to distinguish different objects, rather than to describe specific sequences or primary and secondary relationships.

Referring to "embodiments" in the present application means that specific features, structures, or characteristics described in conjunction with the embodiments can be included in at least one embodiment of the present application. The phrase appearing in various positions in the specification does not necessarily refer to the same embodiment, nor is it an independent or alternative embodiment that is mutually exclusive with other embodiments.

In the description of the present application, it should be noted that unless otherwise specified and limited, the terms "install", "connected with", "connect", and "attach" should be broadly understood. For example, they can be fixed connection, detachable connection, or integrated connection; they can be directly connected, or indirectly connected through an intermediate medium, or they can be communicated between interiors of the two components. For ordinary skilled person in the art, the specific meanings of the above terms in the present application can be understood based on specific circumstances.

In the present application, the term "and/or" is only a description of the association relationship of the associated object, indicating that there can be three types of relationships, such as A and/or B, which can indicate the existence of A alone, the existence of A and B simultaneously, and the existence of B alone. In addition, the character "/" in the present application generally indicates that the associated object is an "or" relationship.

In the embodiments of the present application, the same reference numerals represent the same components, and for simplicity, detailed descriptions of the same components are omitted in different embodiments. It should be understood that the thickness, length, width, and other dimensions of various components in the embodiments of the present application shown in the accompanying drawings, as well as the overall thickness, length, width, and other dimensions of the integrated device, are only illustrative examples and should not constitute any limitations for the present application.

The term 'multiple' in the context of the present application refers to two or more (including two).

In the present application, a battery cell may include lithium-ion secondary battery cell, lithium-ion primary battery cell, lithium-sulfur battery cell, sodium lithium ion battery cell, sodium ion battery cell, or magnesium ion battery cell. The embodiments of the present application are not limited to this. The battery cell can be in cylindrical, flat, cuboid, or other shapes. The embodiments of the present application mainly explain the cylindrical battery cell.

The battery mentioned in the embodiments of the present application refers to a single physical module that includes one or more battery cells to provide higher voltage and capacity. For example, the battery mentioned in the present application may include battery module or battery pack, etc. The battery generally includes a casing configured to encapsulate one or more battery cells. The casing can prevent liquid or other foreign object from affecting the charging or discharging of the battery cell.

The battery cell includes an electrode assembly and an electrolyte, and the electrode assembly is composed of a positive electrode plate, a negative electrode plate, and a separator. The battery cell mainly relies on metal ions moving between the positive electrode plate and negative electrode plate to operate. The positive electrode plate includes a positive electrode current collector and a positive electrode active substance layer. The positive electrode active substance layer is applied on a portion of the surface of the positive electrode current collector, and the portion of the current collector which is not applied with the positive electrode active substance layer protrudes from the portion of the current collector which is applied with the positive electrode active substance layer. The portion of the current collector which is not applied with the positive electrode active substance layer used as the positive electrode tab after stacking. Taking the lithium-ion battery as an example, the material for the positive electrode current collector can be aluminum, and the positive electrode active substance can be lithium cobalt oxide, lithium iron phosphate, ternary lithium, or lithium manganese oxide. The negative electrode plate includes a negative electrode current collector and a negative electrode active substance layer. The negative electrode active substance layer is applied on a portion of the surface of the negative electrode current collector, and the portion of the current collector which is not applied with the negative electrode active substance layer protrudes from the portion of the current collector which is applied with the negative electrode active substance layer. The portion of the current collector which is not applied with the negative electrode active substance layer is used as the negative electrode tab after stacking. The material for the negative electrode current collector can be copper, and the negative electrode active substance can be carbon or silicon. The material of the separator can be PP (polypropylene) or PE (polyethylene), etc. In addition, the electrode assembly can be a wound type of structure or a laminated type of structure, and the electrode assembly in the embodiments of the present application is a wound type of structure.

The inventors found that winding is an indispensable process in the production of the cylindrical battery. In order to achieve high-speed continuous winding production of a winding device, the winding device is usually equipped with two or more winding needles for continuous rotation and fully automatic operation. In the continuous production process, the positive electrode separator, the positive electrode plate, the negative electrode separator, and the negative electrode plate of the battery are sequentially stacked and wound into a cylindrical electrode assembly, ultimately forming a cylindrical battery. The inventors made a further research and found that with market changes, in order for improvement of the performance and capacity of the battery as well as safety considerations, the separator material used are becoming thinner and thinner and the requirements for the winding needle are also becoming higher and higher. Moreover, in the production process of the electrode assembly, the separator material of the electrode assembly is completely in contact with the winding needle, and therefore significant friction occurs when the winding needle is inserted into or detached from the electrode assembly, causing the winding needle to scratch the separator or pull the separator out, thus resulting in the battery being scrapped, and hence a large amount of waste and reduction of the production efficiency.

In view of this, the present application provides a technical solution, in which a winding needle assembly for winding electrode plates and a separator includes a first winding needle and a second winding needle, wherein the first winding needle and the second winding needle are configured to clamp the separator, and the second winding needle is provided with a rolling member on a side of the second winding needle toward the first winding needle. In the above solution, when the electrode assembly of the battery cell is prepared, the first winding needle is placed on a side of the separator, and then the second winding needle is moved along the first winding needle toward the direction of the separator until the second winding needle and the first winding needle clamp the separator. Then, the winding needle assembly is driven to rotate, and the electrode plates are inserted into the separator to rotate with the winding needle assembly until a certain thickness of the electrode assembly is obtained by winding. Then, the second winding needle is moved along the first winding needle and pulled out, and finally the first separator is pulled out. Due to the present of the rolling member arranged on the side of the second winding needle toward the first winding needle, there is rolling friction between the rolling member and the first winding needle, reducing the friction between the first winding needle and the second winding needle, which avoids scratching the separator when the winding needle assembly is inserted into the separator or pulled out of the separator, or avoids misplacing and bringing out part of the separator when the second winding needle is pulled out, thereby improving the production quality and the production efficiency of the battery and avoiding material waste during production.

The battery cell disclosed in the embodiments of the present application can be used, but are not limited to, in the electricity consuming device such as vehicle, ship, or aircraft. A power supply system of the electricity consuming device comprising the battery cell, battery, etc. disclosed in the present application can be used, which is beneficial for improving the stability of battery performance and battery life.

The embodiments of the present application provide an electricity consuming device using a battery as a power source, which can include but is not limited to, mobile phone, tablet, laptop, electric toy, electric tool, battery car, electric car, ship, spacecraft, and so on. Among them, the electric toy can include fixed or mobile electric toy, such as game console, electric car toy, electric ship toy, and electric plane toy, etc. The spacecraft can include airplane, rocket, space shuttle, and spacecraft, etc.

For the convenience of explanation, the following embodiments takes a vehicle 1000 as an example of an electricity consuming device in an embodiment of the present application.

Please refer to FIG. 1, which is a structural schematic diagram of the vehicle 1000 provided in some embodiments of the present application. The vehicle 1000 can be a fuel powered vehicle, a gas powered vehicle, or a new energy vehicle. The new energy vehicle can be a pure electric vehicle, a hybrid electric vehicle, or an extended range vehicle, etc. The interior of vehicle 1000 is equipped with a battery 100, which can be installed in the bottom, the front, or the back of vehicle 1000. The battery 100 can be used for the power supply of vehicle 1000, for example, the battery 100 can serve as the operating power supply of vehicle 1000. The vehicle 1000 can also include a controller 200 and a motor 300, and the controller 200 is configured to control the battery 100 to supply power to the motor 300, for example, for the starting, navigation, and driving power requirements of the vehicle 1000.

In some embodiments of the present application, the battery 100 can not only serve as the operating power source for vehicle 1000, but also as the driving power source for vehicle 1000, replacing or partially replacing fuel or natural gas to provide driving power for vehicle 1000.

Figure 2:
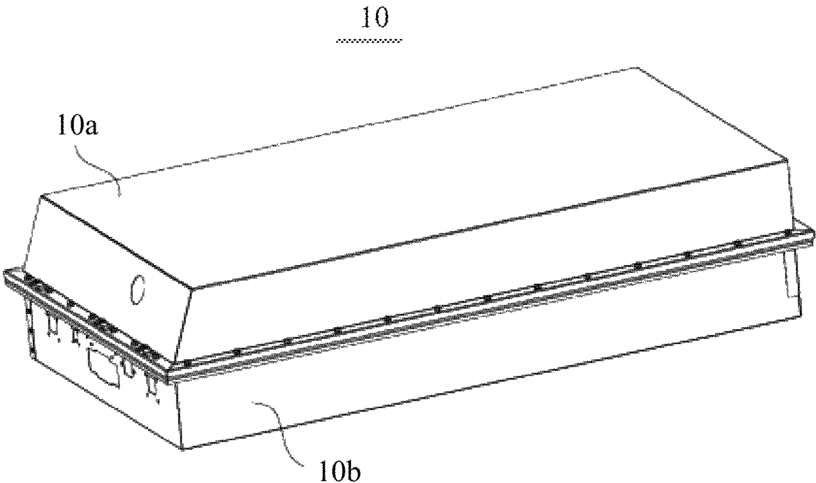
FIG. 2 is a schematic diagram of the structure of the battery provided in some embodiments of the present application.

Please refer to FIG. 2, which is a structural schematic diagram of the battery provided in some embodiments of the present application. The battery 100 includes a casing 10 and a battery cell 20. In some embodiments, the casing 10 may include an upper cover 10*a* and a lower cover 10*b*, with the upper cover 10*a* and the lower cover 10*b* covering and closing each other. The upper cover 10*a* and the lower cover 10*b* jointly define a space for accommodating the battery cell 20. The lower cover 10*b* can be a hollow structure with an opening at an end, and the upper cover 10*a* can be a plate-like structure. The upper cover 10*a* covers and closes the opening side of the lower cover 10*b* so that the upper cover 10*a* and the lower cover 10*b* jointly define the accommodation space. The upper cover 10*a* and the lower cover 10*b* can also be hollow structures with openings on a side, with the opening side of the upper cover 10*a* covers and closes the opening side of the lower cover 10*b*. Of course, the casing 10 formed by the upper cover 10*a* and the lower cover 10*b* can have various shapes, such as cylinder, and cuboid.

Figure 3:
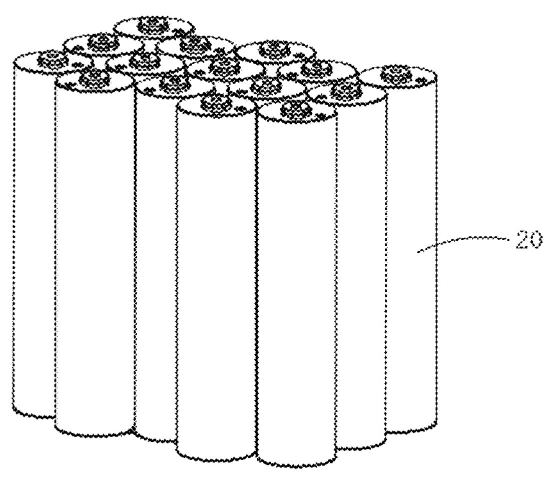
FIG. 3 is a schematic diagram of the structure of the battery module provided in some embodiments of the present application.

FIG. 3 is a structural schematic diagram of the battery module 400 provided in some embodiments of the present application. In the battery 100, multiple battery cells 20 can be provided, and multiple battery cells 20 can be connected in series, parallel, or hybrid. Hybrid connection refers to both series connection and parallel connection among multiple battery cells 20. Multiple battery cells 20 can be directly connected in series, parallel, or hybrid together, and then the whole composed of multiple battery cells 20 can be accommodated in the casing 10. Of course, the battery 100 can also be in the form of a battery module 400 consisting of multiple battery cells 20 connected in series, parallel, or hybrid firstly. Multiple battery modules 400 can then be connected in series, parallel, or hybrid to form a whole and housed in the casing 10. The battery 100 may further include other structures, for example, the battery 100 may further include a busbar component for achieving electrical connection between multiple battery cells 20.

Among them, each battery cell 20 can be a secondary battery or a primary battery. It can also be a lithium sulfur battery, sodium ion battery, or magnesium ion battery, but not limited to this.

Figure 4:
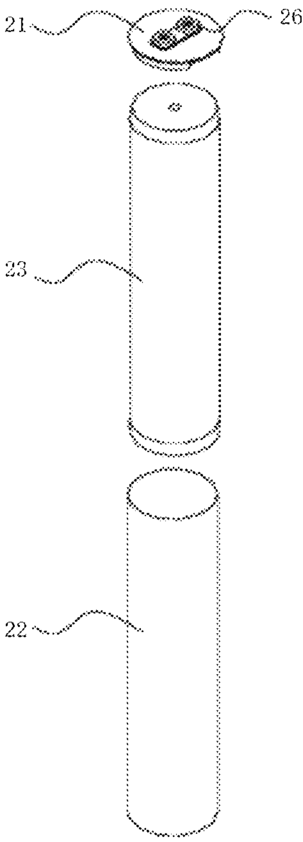
FIG. 4 is an exploded schematic diagram of the battery cell provided in some embodiments of the present application.

Please refer to FIG. 4, which is an exploded structural schematic diagram of the battery cell 20 provided in some embodiments of the present application. The battery cell 20 refers to the smallest unit that constitutes the battery. As shown in FIG. 3, the battery cell 20 includes an end cover 21, a shell 22, an electrode assembly 23, and other functional components.

The end cover 21 refers to a component that covers and closes the opening of the shell 22 to isolate the internal environment of the battery cell 20 from the external environment. Unlimitedly, the shape of the end cover 21 can adapt to the shape of the shell 22 to engage with the shell 22. Optionally, the end cover 21 can be made of a material with a certain hardness and strength (such as aluminum alloy), which makes it less prone to deformation when subjected to compression and collision, enabling the battery cell 20 to have higher structural strength and improved safety performance. Functional component such as electrode terminal 26 can be installed on the end cover 21. The electrode terminal 26 can be electrically connected with the electrode assembly 23 for outputting or inputting electrical energy from or into the battery cell 20. In some embodiments, the end cover 21 may further be equipped with a pressure relief mechanism for releasing internal pressure when the internal pressure or temperature of the battery cell 20 reaches a threshold. The materials of the end cover 21 can also be various, such as copper, iron, aluminum, stainless steel, aluminum alloy, plastic, etc. The embodiments of the present application does not impose special restrictions on this. In some embodiments, an insulating element can further be installed on the inner side of the end cover 21. The insulating element can be configured to isolate the electrical connection components inside the shell 22 from the end cover 21 to reduce the risk of short circuit. For example, insulating element can be plastic, rubber, etc.

The shell 22 is a component configured to engage with the end cover 21 to form an internal environment of the battery cell 20, and the formed internal environment can be configured to accommodate the electrode assembly 23, electrolyte, and other components. The shell 22 and the end cover 21 can be independent components, and an opening can be disposed on the shell 22 and the internal environment of the battery cell 20 is formed by the end cover 21 covering and closing the opening at the opening. In some examples, the shell 22 is a hollow structure with an opening on a side, and the end cover 21 is one and covers and closes the opening of the shell 22. In other examples, the shell 22 is a hollow structure with openings on both sides, the end caps 21 are two, and two end covers 21 cover and close the two openings of the shell 22 respectively. Unlimitedly, it is also possible to integrate the end cover 21 and the shell 22. Specifically, the end cover 21 and the shell 22 can form a common connection surface before other component enters the shell. When it is necessary to encapsulate the interior of the shell 22, the end cover 21 can then cover and close the shell 22. Specifically, the shell 22 is cylindrical in shape, and the material of the shell 22 can be various, such as copper, iron, aluminum, stainless steel, aluminum alloy, plastic, etc. The embodiments of the present application do not impose special restrictions on this.

The electrode assembly 23 is a component in the battery cell 20 that undergoes electrochemical reactions. The shell 22 may contain one or more electrode assemblies 23. The electrode assembly 23 is mainly formed by winding the positive and negative electrode plates, and usually has a separator between the positive and negative electrode plates. The parts of the positive and negative electrode plates that contain active substances form the main body of the electrode assembly 23, while the parts of the positive and negative electrode plates that do not contain active substances each form the electrode tabs. The positive and negative electrode tabs can be located together at an end of the main body or separately at both ends of the main body. During the charging and discharging process of the battery, the positive and negative active substances react with the electrolyte, and the electrode tabs are connected to the electrode terminal 26 to form a current circuit.

Figure 5:
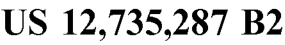
FIG. 5 is a structural schematic diagram of the electrode assembly provided in some embodiments of the present application.
Figure 5:
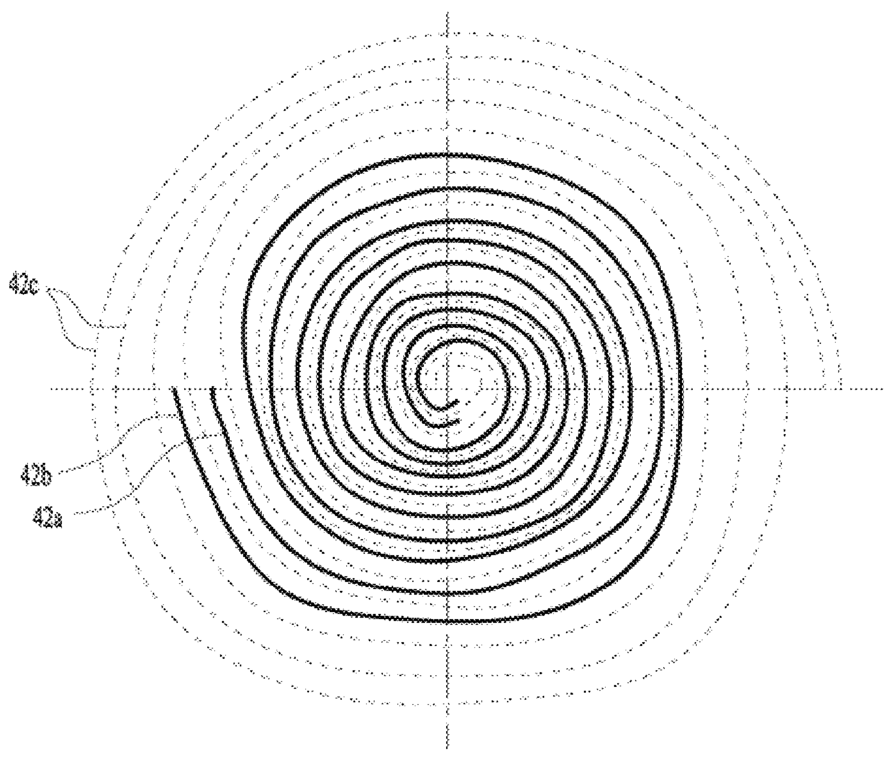

As shown in FIG. 5, FIG. 5 is a structural schematic diagram of the electrode assembly 23 provided in some embodiments of the present application. The electrode assembly 42 of the present application embodiment can be formed by winding the positive electrode plate 42*a*, the negative electrode plate 42*b*, and the separator 42*c* together, wherein the separator 42*c* is an insulator between the positive electrode plate 42*a* and the negative electrode plate 42*b*. The separator 42*c* is configured to isolate the positive electrode plate 42*a* from the negative electrode plate 42*b*, avoiding contacting between the positive electrode plate 42*a* and negative electrode plate 42*b*. When the positive electrode plate 42*a*, negative electrode plate 42*b*, and the separator 42*c* are wound together, at the end of the winding process, the separator 42*c* is individually wound for a predetermined number of turns.

Figure 6:
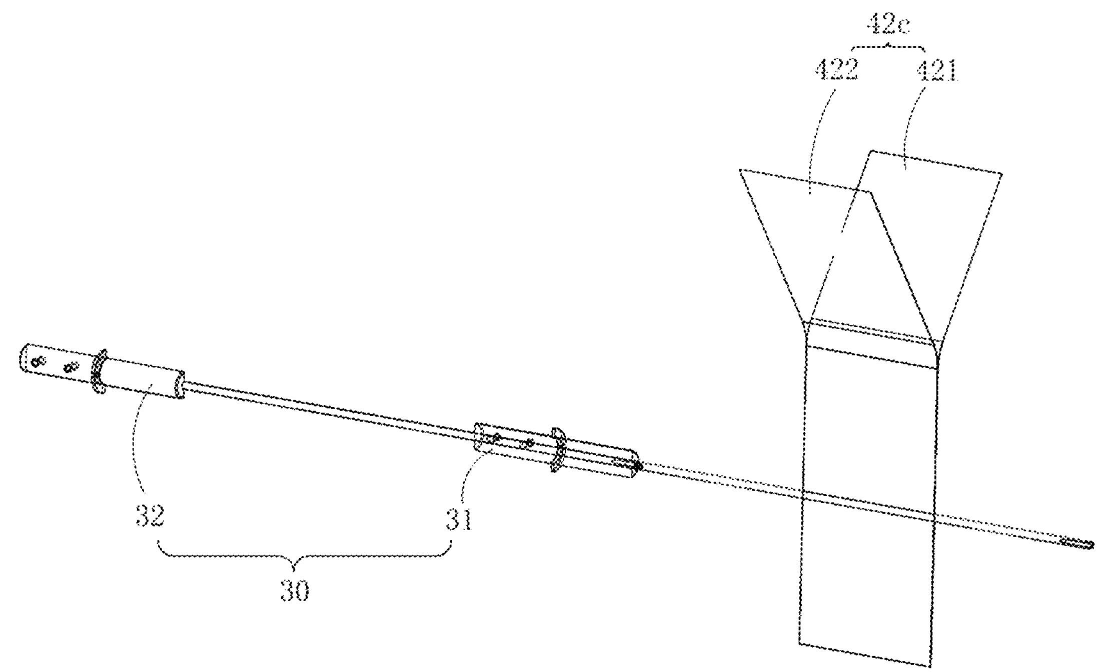
FIG. 6 is a structural schematic diagram of the winding needle assembly provided in some embodiments of the present application.
Figure 7:
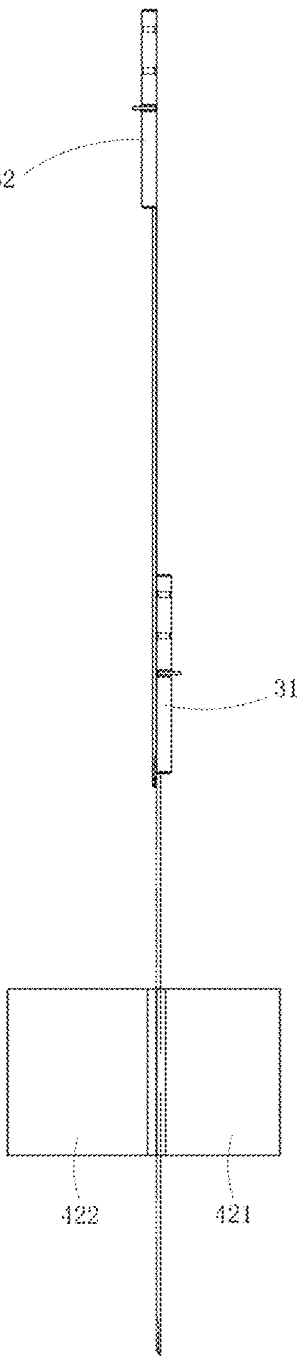
FIG. 7 is a top view of the winding needle assembly shown in FIG. 6.
Figure 8:
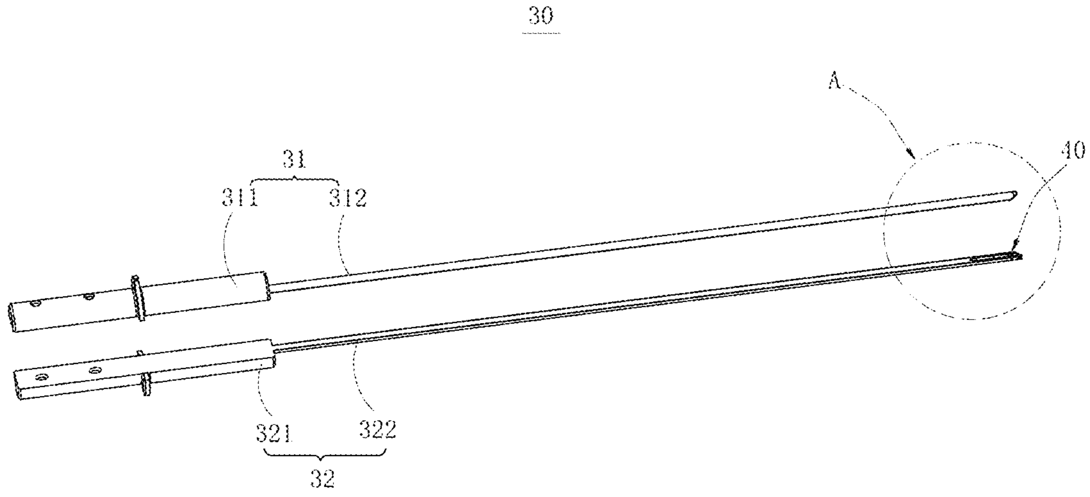
FIG. 8 is a structural schematic diagram from another angle of the winding needle assembly provided in some embodiments of the present application.

FIG. 6 is a structural schematic diagram of the winding needle assembly provided in some embodiments of the present application; FIG. 7 is a top view of the winding needle assembly shown in FIG. 6; FIG. 8 is a structural schematic diagram from another angle of the winding needle assembly provided in some embodiments of the present application. With reference to FIGS. 6 to 8, in the first aspect, the embodiments of the present application provide a winding needle assembly 30 for winding electrode plates and a separator 42*c*. The winding needle assembly 30 includes a first winding needle 31 and a second winding needle 32, the first winding needle 31 and the second winding needle 32 are configured to clamp the separator 42*c*, and a rolling member 40 is arranged on the side of the second winding needle 32 toward the first winding needle 31.

The separator 42*c* includes a positive electrode separator 421 and a negative electrode separator 422, with the positive electrode plate 42*a*, the positive electrode separator 421, the negative electrode plate 42*b*, and the negative electrode separator 422 arranged in sequence. When the electrode assembly 23 of the battery cell is prepared, the separator 42*c* is always in a tension maintaining state to allow the winding needle assembly 30 to be inserted for the convenience of winding-up of the next battery cell. The insertion and pulling-out of the first winding needle 31 and the second winding needle 32 each are individually controlled and move in a staggered manner. Firstly, the first winding needle 31 is placed on a side of the separator 42*c*, and then the second winding needle 32 is moved along the first winding needle 31 toward the direction of the separator 42*c* until the second winding needle 32 and the first winding needle 31 clamp the separator 42*c*, that is, the separator 42*c* is located between the first winding needle 31 and the second winding needle 32. Then, the winding needle assembly 30 is driven to rotate, and the electrode plates are inserted into the separator 42*c* to rotate with the winding needle assembly 30 until a certain thickness of electrode assembly 23 is obtained by winding. Then the second winding needle 32 is moved along the first winding needle 31, and pulled out, and finally the first separator 42*c* is pulled out.

In the above solution, due to the rolling member 40 disposed on the side of the second winding needle 32 toward the first winding needle 31, there is rolling friction between the rolling member 40 and the first winding needle 31, which reduces the friction between the first winding needle 31 and the second winding needle 32, and avoids scratching the separator 42*c* when the winding needle assembly 30 is inserted into the separator 42*c* or pulled out of the separator 42*c*, or misplacing and bringing out part of the separator 42*c* when the second winding needle 32 is pulled out, thereby improving the production quality and the production efficiency of the battery, and avoiding material waste during production.

In other embodiments, multiple rolling members 40 can also be disposed on the side where the second winding needle 32 faces the first winding needle 31, or on the side where the first winding needle 31 faces the second winding needle 32, rolling members 40 can also be disposed to further reduce the friction force between the first winding needle 31 and the second winding needle 32.

In some embodiments, the first winding needle 31 includes a first connecting part 311 and a first winding part 312 connected to each other. The second winding needle 32 includes a second connecting part 321 and a second winding part 322 that are connected to each other. The second connecting part 321 and the first connecting part 311 are fixed to each other. The first winding part 312 and the second winding part 322 are configured to clamp the separator 42*c*, and the rolling member 40 is arranged on the side of the second winding part 322 toward the first winding part 312.

When the electrode assembly 23 of the battery cell is prepared, the first winding needle 31 is first inserted in on a side of the separator 42*c*, so that the first winding part 312 contacts the side of the separator 42*c*. Then, the second winding needle 32 is moved along the first winding needle 31 toward the separator 42*c*, and the rolling member 40 rolls past the separator 42*c*, so that the second winding part 322 is located on the other side of the separator 42*c*. The first winding part 312 and the second winding part 322 clamp the separator 42*c* which is present therebetween. Optionally, the first winding needle 31 and the second winding needle 32 can be designed symmetrically, and the first winding needle 31 and the second winding needle 32 can be combined into a cylindrical structure.

In the above solution, the first winding part 312 and the second winding part 322 are close to each other and assembled for winding the separator 42*c* and the electrode plates. The first connecting part 311 and the second connecting part 321 are fixed to each other, improving the stability of the winding needle assembly 30 and ensuring that the winding needle assembly 30 can maintain stability during the winding process.

In other embodiments, the first winding needle 31 and the second winding needle 32 may also be unfixed to each other and rotated through different driving components.

In some embodiments, the rolling member 40 is provided at an end of the second winding part 322 away from the second connecting part 321.

As the rolling member 40 is located in the front of the second winding part 322, when the second winding part 322 is moved along the first winding part 312 and passes through the separator 42*c*, the rolling member 40 will first contact the separator 42*c* until the rolling member 40 leaves the separator 42*c* and contacts the front of the first winding part 312, aligning the first winding needle 31 with the second winding needle 32. Then the first connecting part 311 and the second connecting part 321 are fixed to drive the winding needle assembly 30 to rotate.

In the above solution, as the rolling member 40 is located in the front of the second winding part 322, during the insertion of the second winding needle 32 toward the separator 42*c*, it is ensured that the first winding needle 31 and the second winding needle 32 are always in contact through the rolling member 40, further improving the protective effect of the winding needle assembly 30 for the separator 42*c*.

Figure 9:
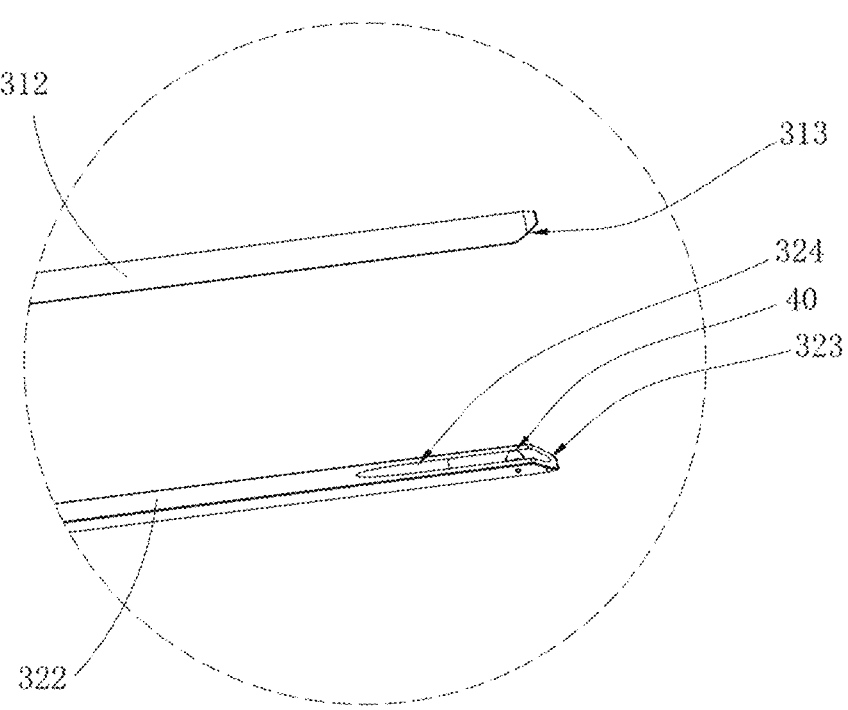
FIG. 9 is an enlarged schematic diagram at Ain FIG. 8.

As shown in FIG. 9, FIG. 9 is an enlarged schematic diagram at A of FIG. 8. In some embodiments, an end of the first winding part 312 away from the first connecting part 311 is provided with a first inclined surface 313. A second inclined surface 323 is arranged at an end of the second winding part 322 away from the first winding part 312, and the first inclined surface 313 is opposite to the second inclined surface 323.

The first inclined surface 313 and the second inclined surface 323 are inclined toward the direction away from each other, forming a triangular gap between them for the insertion of the positioning structure of the external mechanism.

In an ideal state, the first and second winding needles 31 and 32 should be horizontal and parallel to each other. However, in actual production, due to the deformation of the two slender winding needles and the machining and assembly tolerances with the external mechanism itself, it is difficult to adjust the two winding needles to be completely parallel.

In the above solution, the first inclined surface 313 and the second inclined surface 323 are configured for positioning the external mechanism. The first inclined surface 313 and the second inclined surface 323 have a guiding function, and the positioning structure of the external mechanism can be inserted between the first inclined surface 313 and the second inclined surface 323, so as to support the first winding part 312 and the second winding part 322 apart, adjust the distance between the first winding part 312 and the second winding part 322, and improve the parallelism between the first winding needle 31 and the second winding needle 32.

In some embodiments, the first connecting part 311 protrudes from the first winding part 312 in a direction away from the second winding needle 32. The thickness of the first connecting part 311 is greater than that of the first winding part 312, and the first winding part 312 is relatively thin, which facilitates the first winding part 312 to wind the separator 42*c* and improve the energy density of the battery cell. The first connecting part 311 is relatively thick, which facilitates the connection and fixation of the first connecting part 311 and improves the strength of the entire winding needle assembly 30.

In other embodiments, the second connecting part 321 protrudes from the second winding part 322 in a direction away from the first winding needle 31. The thickness of the second connecting part 321 is greater than that of the second winding part 322, and the second winding part 322 is relatively thin, which facilitates the second winding part 322 to wind the separator 42*c* and improve the energy density of the battery cell. The second connecting part 321 is relatively thick, which facilitates the connection and fixation of the second connecting part 321 and improves the strength of the entire needle winding assembly 30.

In some further embodiments, the first connecting part 311 is arranged to protrude in a direction away from the second winding needle 32 relative to the first winding part 312, and the second connecting part 321 is arranged to protrude in a direction away from the first winding needle 31 relative to the second winding part 322, which facilitates the first winding part 312 and the second winding part 322 to wind the separator 42*c*, thereby improving the energy density of the battery cell, and facilitates the connection and fixation between the first connecting part 311 and the second connecting part 321, thereby improving the strength of the entire needle assembly 30.

In some embodiments, the side of the second winding needle 32 toward the first winding needle 31 and the side of the first winding needle 31 toward the second winding needle 32 are both planar.

The first winding needle 31 and the second winding needle 32 can be symmetrical semi cylindrical, and they can be combined to form a cylindrical structure, which facilitates the winding of the separator 42*c* and the electrode plates to obtain a cylindrical battery cell.

In the above solution, it is convenient for the first winding needle 31 and the second winding needle 32 to fit together, reducing the gap between the first winding needle 31 and the second winding needle 32, enhancing the parallelism between the first winding needle 31 and the second winding needle 32, and improving the winding effect of the winding needle assembly 30.

In some embodiments, at least a portion of the rolling member 40 protrudes from the side of the second winding needle 32 toward the first winding needle 31. A portion of the rolling member 40 can be accommodated inside the first winding needle 31, while the other portion protrudes from the plane of the first winding needle 31 toward the second winding needle 32.

In the above solution, it is ensured that the second winding needle 32 always contacts the first winding needle 31 through the rolling member 40 when the second winding needle 32 is inserted into the separator 42*c* or pulled out of the separator 42*c* relative to the first winding needle 31, avoiding sliding friction between the first winding needle 31 and the second winding needle 32, instead of being replaced by rolling friction, ensuring that the winding needle assembly 30 does not scratch the separator 42*c* when the winding needle assembly is inserted into the separator 42*c* or pulled out of the separator 42*c*, and that part of the separator 42*c* is not misplaced and brought out when the second winding needle 32 is pulled out.

In some embodiments, the rolling member 40 protrudes for 0.5-5 mm from the side of the second winding needle 32 toward the first winding needle 31. The rolling member 40 is slightly convex relative to the second winding needle 32, which can ensure rolling friction between the first winding needle 31 and the second winding needle 32, reduce the friction between the two, avoid the protruding part of the rolling member 40 being too thick, and thus avoid affecting the parallelism between the first winding needle 31 and the second winding needle 32.

Figure 10:
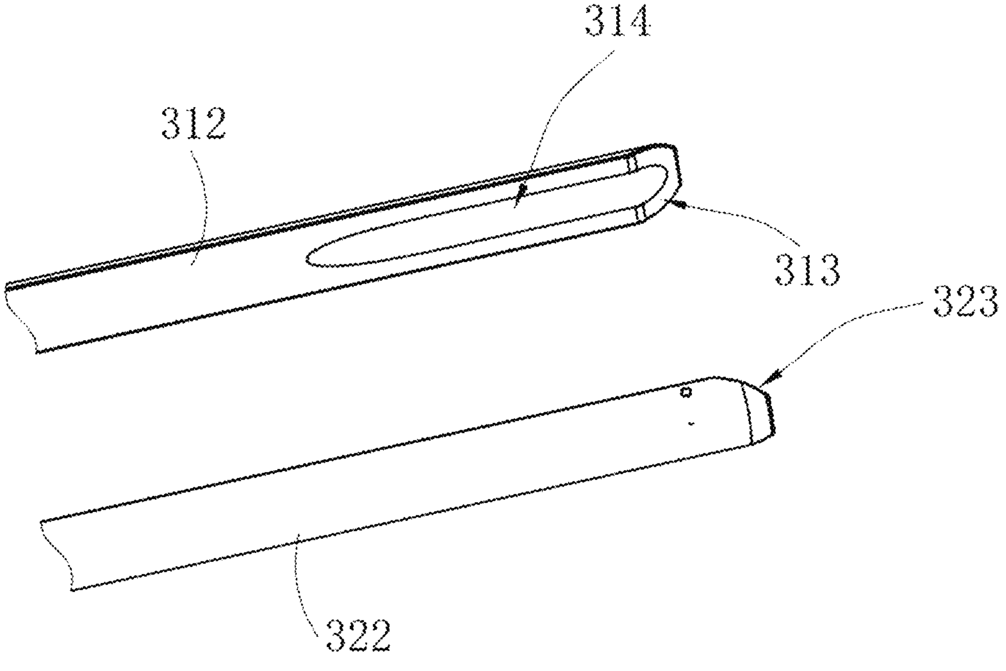
FIG. 10 is a partial structural schematic diagram of the winding needle assembly provided in some embodiments of the present application.

As shown in FIG. 10, FIG. 10 is a partial structural schematic diagram of the winding needle assembly provided in some embodiments of the present application. In some embodiments, a first groove 314 is arranged on a side of the first winding needle 31 toward the second winding needle 32, and the first groove 314 is configured to avoid the rolling member 40. When the second winding needle 32 is inserted into place, the protruding part of the rolling member 40 relative to the first winding needle 31 can be accommodated in the first groove 314 of the second winding needle 32, ensuring the parallelism between the first winding needle 31 and the second winding needle 32, and improving the winding effect of the winding needle assembly 30.

Optionally, the first groove 314 can be an elongated hole extending along the axial direction of the first winding needle 31, so that when the second winding needle 32 is inserted into place, the rolling member 40 can smoothly enter the first groove 314.

In some embodiments, a second groove 324 is arranged on a side of the second winding needle 32 toward the first winding needle 31, the rolling member 40 is accommodated in the second groove 324, and the second groove 324 is opposite to the first groove 314. Due to the symmetrical design of the second groove 324 of the second winding needle 32 and the first groove 314 of the first winding needle 31, the winding needle assembly 30 is more aesthetically pleasing, and the same mold can be used to obtain the first groove 314 and the second groove 324 during processing without distinction, thereby improving processing efficiency.

Figure 11:
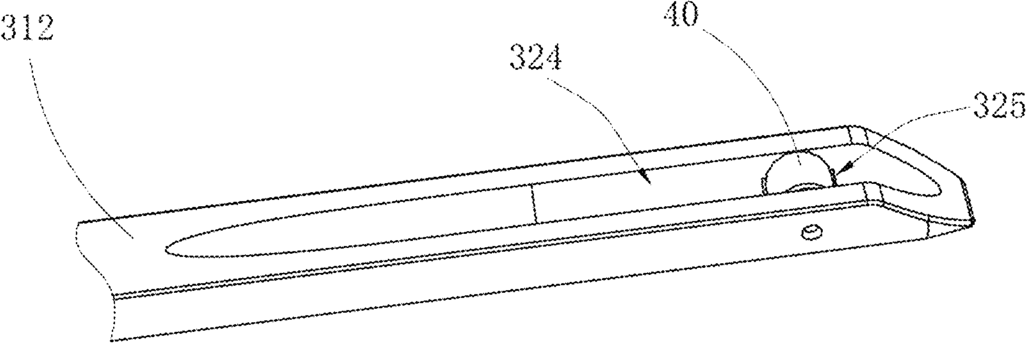
FIG. 11 is a partial structural schematic diagram of the second winding needle provided in some embodiments of the present application.

As shown in FIG. 11, FIG. 11 is a partial structural schematic diagram of the second winding needle provided in some embodiments of the present application. In some embodiments, the bottom wall of the second groove 324 is recessed toward a side away from the first winding needle 31 so as to form a third groove 325, and at least part of the rolling member 40 is accommodated in the third groove 325.

The projection of the third groove 325 along the radial direction of the second winding needle 32 falls into the second groove 324. A portion of the rolling member 40 is accommodated in the third groove 325, a portion thereof is accommodated in the second groove 324, and a further portion protrudes relative to the second winding needle 32.

In the above solution, the disposing of the third groove 325 can ensure that more part of the rolling member 40 is accommodated in the first winding needle 31, and only a few part of the rolling member 40 protrudes. The third groove 325 has a limiting effect for the rolling member 40, improving the stability of the rolling member 40 during rolling.

Figure 12:
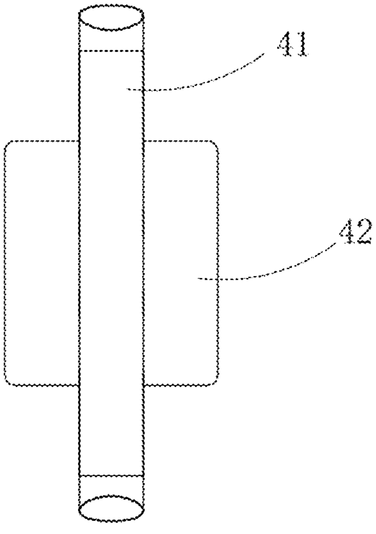
FIG. 12 is a structural schematic diagram of the rolling member provided in some embodiments of the present application.
Figure 13:
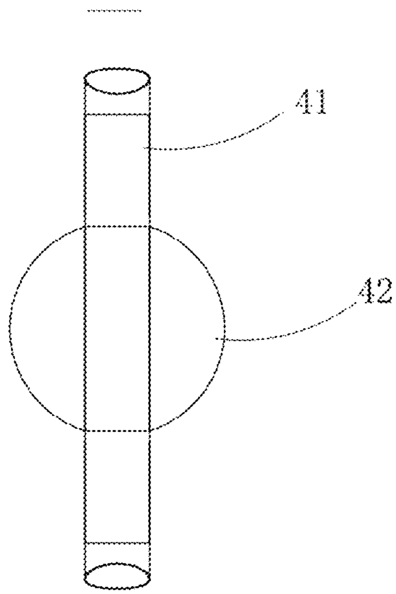
FIG. 13 is a structural schematic diagram of the rolling member provided in other embodiments of the present application.

FIG. 12 is a structural schematic diagram of the rolling member provided in some embodiments of the present application; FIG. 13 is a structural schematic diagram of the rolling member provided in other embodiments of the present application. As shown in FIGS. 12 and 13, in some embodiments, the rolling member 40 includes a fixed shaft 41 and a rolling body 42. The rolling body 42 can be a pin roller or a ball, and the two ends of the fixed shaft 41 each are fixed to the second winding needle 32. The rolling body 42 is rotatably connected to the fixed shaft 41, further improving the stability of the rolling member 40 during rolling.

Figure 14:
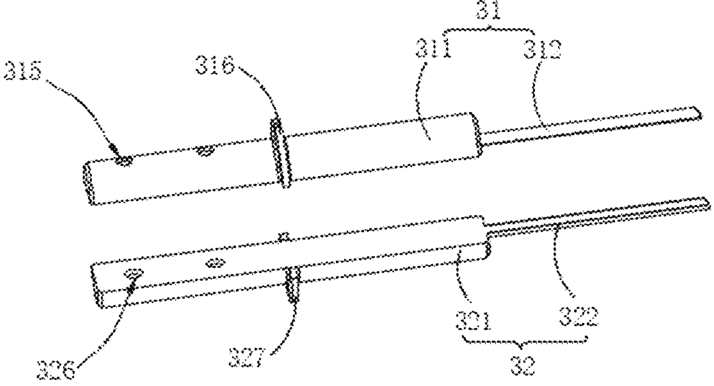
FIG. 14 is another partial structural schematic diagram of the winding needle assembly provided in some embodiments of the present application.

FIG. 14 is a schematic diagram of another part of the winding needle assembly provided in some embodiments of the present application. As shown in FIG. 14, in some embodiments, the first winding needle 31 is provided with at least one first fixing hole 315. The second winding needle 32 is provided with at least one second fixing hole 326, which is disposed corresponding to the first fixing hole 315.

The first fixing hole 315 and the second fixing hole 326 can be bolt holes, and the first fixing hole 315 and the second fixing hole 326 are respectively passed through by bolt to fix the first and second winding needles 31 and 32. The number of first fixing holes 315 and second fixing holes 326 can be multiple, respectively, to enhance the connection strength.

In the above solution, a fixed connection between the first winding needle 31 and the second winding needle 32 can be achieved through the first fixing hole 315 and the second fixing hole 326. The connection way is simple, reduces costs, and improves assembly efficiency.

The opposite ends of the winding needle assembly 30 can be connected and fixed with an external mechanism to support the rotation of the winding needle assembly 30. In some embodiments, the first winding needle 31 is provided with a first positioning part 316 configured to be fixed with the external mechanism. The first positioning part 316 can be arranged to protrude along the outer side of the first winding needle 31, further improving the stability of the first winding needle 31 during winding.

In other embodiments, the second winding needle 32 is provided with a second positioning part 327 configured to be with an external mechanism. The second positioning part 327 can be arranged to protrude along the outer side of the second winding needle 32, further improving the stability of the second winding needle 32 during winding.

In some other embodiments, the first winding needle 31 is provided with a first positioning part 316 configured to be fixed with an external mechanism, and the second winding needle 32 is provided with a second positioning part 327 configured to be fixed with an external mechanism, further improving the stability of the winding needle assembly 30 during winding.

The embodiment of the second aspect of the present application provides a winding device, including a driving mechanism and a winding needle assembly 30 of any of the above embodiments, and the driving structure is configured to drive the winding needle assembly 30 to rotate.

According to some embodiments of the present application, the present application provides a winding needle assembly 30 for winding electrode plates and a separator 42*c*. The winding needle assembly 30 includes a first winding needle 31 and a second winding needle 32, the first winding needle 31 and the second winding needle 32 are configured to clamp the separator 42*c*, and a rolling member 40 is arranged on the side of the second winding needle 32 toward the first winding needle 31. In the above solution, due to the presence of the rolling member 40 arranged on the side of the second winding needle 32 toward the first winding needle 31, there is rolling friction between the rolling member 40 and the first winding needle 31, reducing the friction between the first winding needle 31 and the second winding needle 32, which avoids scratching the separator 42*c* when the winding needle assembly 30 is inserted into the separator 42*c* or pulled out of the separator 42*c*, or misplacing and bringing out part of the separator 42*c* when the second winding needle 32 is pulled out, thereby improving the production quality and the production efficiency of the battery and avoiding material waste during production.

It should be noted that in the absence of conflicts, the embodiments and the features in the embodiments in the present application can be combined with each other.

Finally, it should be noted that the above embodiments are only used to illustrate the technical solutions of the present application, but not to limit them. Although the present application has been described in detail with reference to the aforementioned embodiments, ordinary skilled person in the art should understand that they can still modify the technical solutions recorded in the aforementioned embodiments or equivalently replace some of the technical features, but these modifications or substitutions do not make the essence of the corresponding technical solutions deviate from the spirit and scope of the technical solutions in the various embodiments of the present application.

What is claimed is:

1. A winding needle assembly, comprising a first winding needle; and a second winding needle, wherein the first winding needle and the second winding needle are configured to clamp a separator, and the second winding needle comprises a rolling member on a side of the second winding needle toward the first winding needle, wherein the rolling member comprises:

a fixed shaft with two ends, each of the two ends fixed to the second winding needle; and a rolling body rotatably connected to the fixed shaft.

2. The winding needle assembly according to claim 1, wherein the first winding needle comprises a first connecting part and a first winding part that are connected to each other;

the second winding needle comprises a second connecting part and a second winding part that are connected to each other, the second connecting part and the first connecting part are fixed to each other, the first winding part and the second winding part are configured to clamp the separator, and the rolling member is disposed on a side of the second winding part toward the first winding part.

3. The winding needle assembly according to claim 2, wherein the rolling member is arranged at an end of the second winding part away from the second connecting part.

4. The winding needle assembly according to claim 2, wherein a first inclined surface is arranged at an end of the first winding part away from the first connecting part;

a second inclined surface is arranged at an end of the second winding part away from the first winding part, and the first inclined surface is opposite to the second inclined surface.

5. The winding needle assembly according to claim 2, wherein at least one of:

the first connecting part protrudes in a direction away from the second winding needle relative to the first winding part; or, the second connecting part protrudes in a direction away from the first winding needle relative to the second winding part.

6. The winding needle assembly according to claim 1, wherein both a side of the second winding needle toward the first winding needle and a side of the first winding needle toward the second winding needle are planar.

7. The winding needle assembly according to claim 6, wherein at least a portion of the rolling member protrudes from the side of the second winding needle toward the first winding needle.

8. The winding needle assembly according to claim 7, wherein the rolling member protrudes for 0.5 mm-5 mm from the side of the second winding needle toward the first winding needle.

9. The winding needle assembly according to claim 7, wherein a first groove is provided on the side of the first winding needle toward the second winding needle, and the first groove is configured to avoid the rolling member.

10. The winding needle assembly according to claim 9, wherein a second groove is provided on the side of the second winding needle toward the first winding needle, the rolling member is accommodated in the second groove, and the second groove is opposite to the first groove.

11. The winding needle assembly according to claim 10, wherein a third groove is provided by recessing a bottom wall of the second groove toward a side away from the first winding needle, and the at least a portion of the rolling member is accommodated in the third groove.

12. The winding needle assembly according to claim 1, wherein the first winding needle comprises at least one first fixing hole; and the second winding needle comprises at least one second fixing hole, the second fixing hole is disposed corresponding to the first fixing hole.

13. The winding needle assembly according to claim 1, wherein at least one of:

the first winding needle comprises a first positioning part configured to be fixed with an external mechanism; or;

the second winding needle comprises a second positioning part configured to be fixed with an external mechanism.

14. A winding device, comprising:

a winding needle assembly, the winding needle assembly comprising:

a first winding needle; and a second winding needle, wherein the first winding needle and the second winding needle are configured to clamp a separator, and the second winding needle comprises a rolling member on a side of the second winding needle toward the first winding needle; and a driving mechanism configured to drive the winding needle assembly to rotate, wherein the rolling member comprises:

a fixed shaft with two ends, each of the two ends fixed to the second winding needle; and a rolling body rotatably connected to the fixed shaft.

15. The winding device according to claim 14, wherein the first winding needle comprises a first connecting part and a first winding part that are connected to each other;

the second winding needle comprises a second connecting part and a second winding part that are connected to each other, the second connecting part and the first connecting part are fixed to each other, the first winding part and the second winding part are configured to clamp the separator, and the rolling member is disposed on a side of the second winding part toward the first winding part.

16. The winding device according to claim 15, wherein the rolling member is arranged at an end of the second winding part away from the second connecting part.

17. The winding device according to claim 15, wherein a first inclined surface is arranged at an end of the first winding part away from the first connecting part;

a second inclined surface is arranged at an end of the second winding part away from the first winding part, and the first inclined surface is opposite to the second inclined surface.

18. The winding device according to claim 15, wherein at least one of:

the first connecting part protrudes in a direction away from the second winding needle relative to the first winding part; or, the second connecting part protrudes in a direction away from the first winding needle relative to the second winding part.

19. The winding device according to claim 14, wherein both a side of the second winding needle toward the first winding needle and a side of the first winding needle toward the second winding needle are planar.

20. A winding needle assembly, comprising a first winding needle; and a second winding needle, wherein the first winding needle and the second winding needle are configured to clamp a separator, and the second winding needle comprises a rolling member on a side of the second winding needle toward the first winding needle, wherein both a side of the second winding needle toward the first winding needle and a side of the first winding needle toward the second winding needle are planar, wherein at least a portion of the rolling member protrudes from the side of the second winding needle toward the first winding needle, wherein a first groove is provided on the side of the first winding needle toward the second winding needle, and the first groove is configured to avoid the rolling member.

* * * * *